United States Patent [19]

Tanis

[11] Patent Number: 5,196,673
[45] Date of Patent: Mar. 23, 1993

[54] AIRCRAFT INTAKE PIPE BOLT HEATER FOR ELECTRICALLY PREHEATING AN AIRCRAFT ENGINE

[76] Inventor: Peter G. Tanis, R.R. 4, P.O. Box 143, Glenwood, Minn. 56334

[21] Appl. No.: 611,769

[22] Filed: Nov. 13, 1990

[51] Int. Cl.⁵ .................. H05B 3/40; F02N 17/02; F16B 23/00; F02M 31/12
[52] U.S. Cl. .................. 219/205; 123/142.5 E; 123/549; 219/200; 219/201; 219/206; 219/523; 219/544; 411/395; 411/411
[58] Field of Search .................. 219/205–208, 219/202, 523, 200, 201, 544; 411/395, 411; 123/142.5 R, 142.5 E, 549

[56] References Cited

U.S. PATENT DOCUMENTS

| | | | |
|---|---|---|---|
| 1,211,935 | 1/1917 | Groshans | 123/142.5 E |
| 1,332,970 | 3/1920 | Berres | 184/104 A |
| 1,377,352 | 5/1921 | Johnson | 219/206 X |
| 1,395,949 | 11/1921 | Eckman | 219/205 |
| 1,416,897 | 5/1922 | Simon | . |
| 1,517,301 | 2/1924 | McMichael | 219/205 X |
| 1,553,026 | 9/1925 | Brown | 219/205 |
| 1,784,541 | 12/1930 | Rouillard | 219/205 |
| 1,794,891 | 3/1931 | Gerhardt | 219/205 |
| 1,805,040 | 5/1931 | Groves | 219/205 X |
| 1,806,442 | 5/1931 | Bell et al. | . |
| 1,817,850 | 8/1931 | Schwalbach | . |
| 2,000,825 | 5/1935 | Davies | 219/205 U X |
| 2,487,326 | 11/1949 | Freeman | 123/142.5 E |
| 2,680,185 | 6/1954 | Basile | 219/205 |
| 2,698,374 | 12/1954 | Carpenter | . |
| 2,834,864 | 5/1958 | Grinde | 219/208 X |
| 3,209,640 | 10/1965 | Waivers | 411/395 |
| 3,213,263 | 10/1965 | Steenbergen | 219/205 |
| 3,538,302 | 11/1970 | Volling | 219/201 |
| 3,953,707 | 4/1976 | Tanis | 219/205 |

FOREIGN PATENT DOCUMENTS

| | | | |
|---|---|---|---|
| 1050935 | 2/1959 | Fed. Rep. of Germany | 219/201 |
| 2935430 | 3/1981 | Fed. Rep. of Germany | 219/523 |
| 1139064 | 2/1965 | United Kingdom | 219/523 |

*Primary Examiner*—Anthony Bartis
*Attorney, Agent, or Firm*—Burd, Bartz & Gutenkauf

[57] ABSTRACT

A preheat device for preheating an internal combustion aircraft engine having an air intake pipe connected to a cylinder head by threaded mounting bolts is configured as a replacement bolt with a zinc - plated body having a bolt head and threaded shank. The body is made of steel heat treated to grade 8 hardness and tempered at apprximately 1,050 degrees F. and had an axial bore open at the head and extending toward and into the shank. An electric heating element surrounded by a stainless steel sheath is positioned in the bore. The shank has a thread with a flat root to provide a wall thickness approximately 0.060 inch. Each cylinder of the engine is provided with a preheat device in place of a mounting bolt and the preheat devices are connected to each other by a wiring harness connectable to an external power source. When energized the heating element of each preheat device generates heat that in transferred through the screw threads to the cylinder head of the engine cylinder.

11 Claims, 1 Drawing Sheet

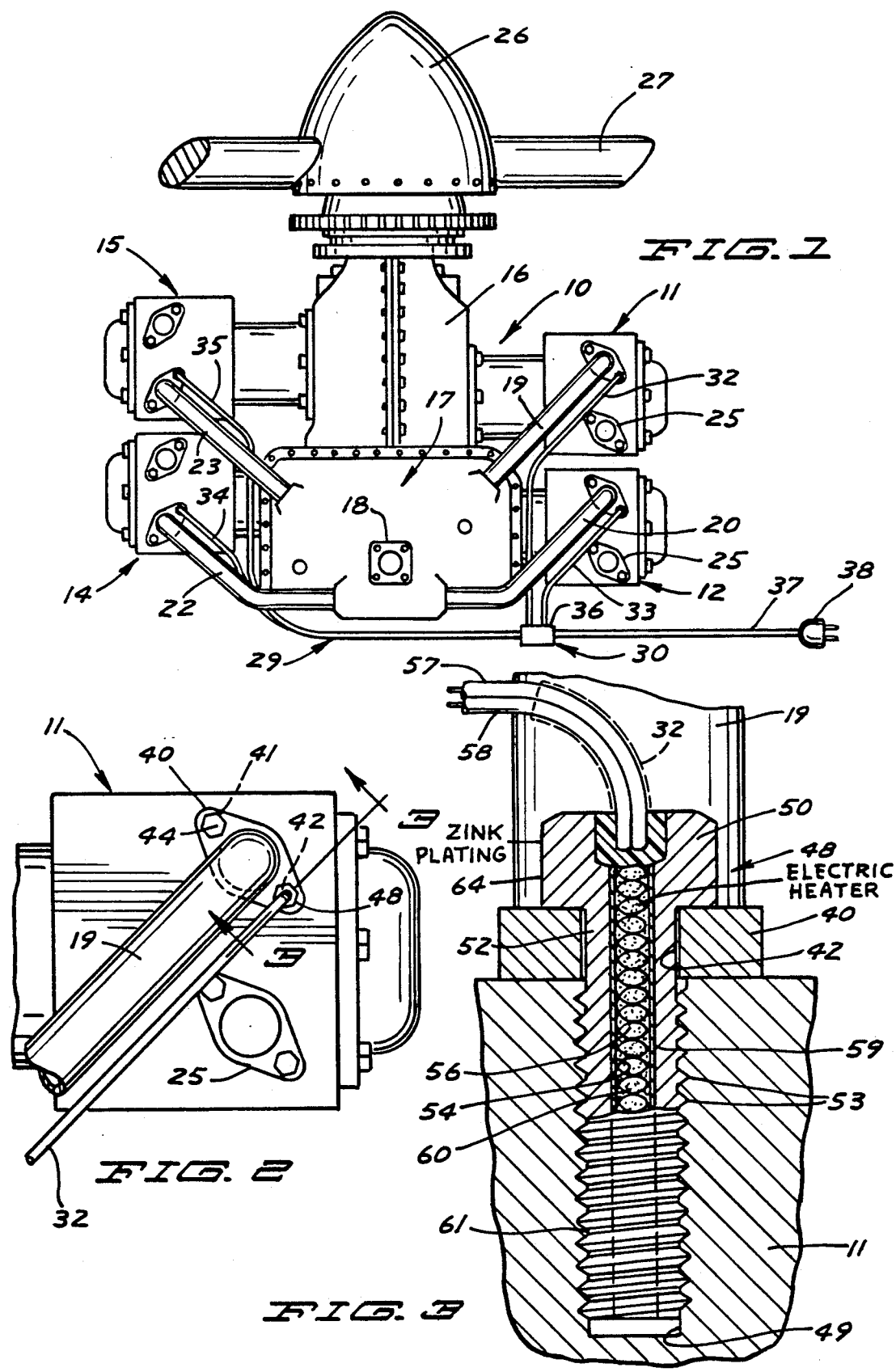

AIRCRAFT INTAKE PIPE BOLT HEATER FOR ELECTRICALLY PREHEATING AN AIRCRAFT ENGINE

BACKGROUND OF THE INVENTION

In cold weather it is usually necessary to preheat an aircraft internal combustion engine exposed to the low temperature in order to facilitate starting. Without preheating, starting the engine under such circumstances is difficult and, even if starting is accomplished, it can be harmful to the cold engine components.

A common method of preheating an aircraft engine involves blowing hot air into the engine compartment. Apparatus to accomplish this includes portable combustion heaters and portable electric heaters with fans. These systems are inconvenient and are not very portable and not an integral part of the engine whereby they may accompany the aircraft. These systems may also expose the aircraft to undue fire hazzard.

An aircraft engine preheating apparatus is described in U.S. Pat. No. 3,953,707 issued Apr. 27, 1976 to Tanis. That patent describes an electric heating element constructed to fit in the thermocouple holes of the cylinder heads of aircraft engines which are normally not fitted with thermocouples for more than one cylinder head. However, for those engines not equipped with such thermocouple holes, mounting holes must be specially drilled in each cylinder head.

SUMMARY OF THE INVENTION

The invention pertains to an apparatus to preheat an internal combustion engine in particular an air-cooled aircraft engine and the liquid cooled variety having a similar configuration as well as other air-cooled engines such as a motorcycle engine of the type equipped with multiple individual cylinder heads. Such engines have air intake pipes connected to the cylinder heads by a plurality of bolts, generally two. A heater device according to the present invention comprises a replacement for one of the air intake pipe attachment bolts. The heater includes an elongated threaded shank attached to a bolt head presenting an outer configuration like that of and in replacement of the attachment bolt. The shank has a central axial bore that extends through the head as well. A heating element is located in the bore and is attached to electrical leads that extend from the head of the heater and are connected to a wiring harness. The wiring harness connects the heaters of each of the cylinder heads to a source of electricity. The heater is specially constructed in order to achieve structural integrity necessary to serve as a replacement piece for the intake pipe attachment bolt.

IN THE DRAWINGS

FIG. 1 is a view of a four-cylinder air-cooled aircraft engine as viewed from the bottom when installed on an aircraft and having preheating apparatus according to the invention;

FIG. 2 is an enlarged view of one of the cylinder heads of the aircraft engine of FIG. 1; and FIG. 3 is an enlarged sectional view of a portion of the cylinder head of FIG. 2 taken along the line 3—3 thereof and showing a preheater device installed therein.

DESCRIPTION OF A PREFERRED EMBODIMENT

Referring to the drawings, FIG. 1 shows an internal combustion aircraft engine 10 of the four-cylinder, air-cooled variety. Engine 10 has first, second, third and fourth cylinder heads 11, 12, 14 and 15 connected to a crankcase 16. Engine 12 has an oil sump casing 17 provided with a carburetor mount 18 for mounting a carburetor (not shown), and a plurality of fuel air induction or air intake pipes 19, 20, 22, 23, one corresponding to each cylinder head. An exhaust opening 25 is associated with each cylinder head for connection to an exhaust pipe (not shown). A propeller assembly is connected to the engine 10 in usual fashion including a propeller spinner 26 carrying propeller blades 27.

A preheat apparatus according to the invention is indicated generally at 29 and includes a wiring harness 30 having first, second, third and fourth heater leads 32–35 extending respectively to the first through fourth cylinder heads. The heater leads are connected at one end to a junction board 36 connected to a power lead 37 terminating in a power plug 38 connectable to a remote electrical power source. The far ends of the heater leads are each connected to a heater device installed in the respective cylinder heads.

The heater installations in the cylinder heads are alike in construction as shown with respect to the first cylinder head 11 in FIGS. 2 and 3. The end of the air intake pipe 19 is curved toward the cylinder head and terminates in a mounting flange 40 having a pair of diametrically opposed mounting openings 41, 42. A standard cap screw or mounting bolt 44 is secured in one of the holes 41 and into a corresponding threaded opening (not shown) in cylinder head 11.

A heater device 48 passes through the other opening 42 of mounting flange 40 and into a threaded mounting opening 49 of cylinder head 11 which is normally for receipt of another mounting bolt. Heater device 48 has an outer configuration like the standard air intake pipe mounting bolt so as to be a replacement for one. At the same time, heater device 48 provides heat to cylinder head 11 for preheat purposes. Heater device 48 includes a body having a hexagonal bolt head 50 attached to an elongate bolt shank 52 carrying exterior threads 53 engageable with interior threads of opening 49. Shank 52 has a central axial bore 54 extending from the interior end thereof and outwardly of the opposite end at the head 50. A heating element 56 is located in the central bore 54 and is connected to electrical connectors 57, 58 extending outwardly of the head 50 and encased in the first wiring harness heater lead 32. Heating element 56 is comprised as a Nichrome wire coil typically having $\frac{1}{8}$ inch diameter and a length of one inch, encased in a stainless steel sheath 59. A ceramic filler 60 surrounds element 56. The heating element can be potted into the bore 54 with a suitable heat setting polyester resin 63 or, alternatively, the tip of the element can be silver soldered to the shank. Heat generated by the heating element 56 is transferred by conduction through the threads 53 into the cylinder head 11.

As the heater device body replaces a standard intake pipe mounting bolt, it must be equal in strength to the bolt which it replaces even though it is hollow and the bolt is solid. Several procedures are adopted in constructing the heater element body to accomplish this end. This includes selecting a steel that is stronger and tougher than the steel of the bolt which it replaces, such as a 41L40 chromium molybdenum steel. The body is machined such that there are no sharp edges to become stress risers, with a wall thickness of approximately 0.060 inch. The body is formed with a modified thread so that the stress riser at the bottom of the thread is eliminated, leaving a flat portion 61 at the root. This results in a greater wall thickness. The bolt body is heated to a "grade 8" hardness as opposed to the "grade 5" hardness of the bolt that it replaces. This requires a special temper since the tempering must be done at a temperature above the range of operation of heater element 56, otherwise heater operation would alter the strength of the body. The heater body can be tempered at 1050 degrees F. after being heat treated. The heater body is plated with zinc 64 to reduce or prevent corrosion. The plating process introduces hydrogen embrittlement which could cause weakening of the heater body. This is counteracted by baking the body at 375 degrees F. for eight hours following the plating. This removes the hydrogen and allows the body to retain its strength.

In use, heater devices are installed with respect to each individual cylinder head in replacement of one of the mounting bolts of the intake air pipe of the cylinder. While there is shown a four cylinder aircraft engine, the invention is equally applicable to a six cylinder aircraft engine, or other engines having individual cylinder heads such as a two cylinder motorcycle engine. In certain instances the heater device could be installed as a replacement attachment bolt for air exhaust pipe. The heat elements are connected by a harness which is connected to a power plug. The power plug is connected to a source of electrical energy which energizes the heating devices to preheat the cylinders. The power plug is disconnected when the cylinders are sufficiently preheated that the engine may be safely started.

While there has been shown and described a certain embodiment of the invention, it will be apparent that deviations can be made without departing from the scope and spirit thereof.

The embodiments of the invention in which an exclusive property or privilege is claimed are defined as follows:

1. A preheat apparatus for an internal combustion engine of the type having a plurality of individual cylinder heads, an air intake pipe connectable to each cylinder head by fixation of a fastening member between the air intake pipe and a threaded mounting hole in the cylinder head, comprising:
    a plurality of heater devices for installation with respect to the cylinder heads of the engine;
    each said heater device having a body with an air intake pipe mounting bolt-like configuration including a bolt head and a threaded bolt shank installable in an air intake pipe mounting bolt opening of the cylinder head
    said bolt shank having a thread with a flat root to provide a wall thickness of approximately 0.060 inch;
    said body formed of steel heat treated to a grade 8 hardness and tempered at approximately 1,050 degrees F.;
    heater means installed in the shank of the body;
    a wiring harness having a plurality of interconnected heater leads connected to the heater means of the heater devices and a power lead connectable to a source of electrical power.

2. The preheat apparatus of claim 1 wherein:
    said body has an axial bore open at the head and extending toward the end of the shank;
    said heater means comprised as an electric heating element installed in the axial bore of the body.

3. The preheat apparatus of claim 2 wherein:
    said heating element is comprised as a wire coil.

4. The preheat apparatus of claim 3 including:
    a stainless steel sheath surrounding the heating element.

5. The preheat apparatus of claim 2 wherein:
    said heating element is comprised as a Nichrome wire coil.

6. The preheat apparatus of claim 2 wherein:
    said body is zinc plated and baked at 375 degrees for eight hours.

7. A heater device for installation in an air intake pipe mounting bolt opening as a replacement fastener for a mounting bolt mounting an air intake pipe to an individual cylinder head of an internal combustion engine for the purpose of preheating the cylinder head prepatory to starting the engine, comprising:
    a body with an air intake pipe mounting bolt-like configuration including a bolt head and a threaded bolt shank installable in an air intake pipe mounting bolt opening of a cylinder head;
    said body having an axial bore open at the head and extending toward the end of the shank;
    said bolt shank having a thread with a flat root to provide a wall thickness of approximately 0.060 inch;
    said body formed of steel heat treated to a grade 8 hardness and tempered at approximately 1,050 degrees F.;
    an electric heating element comprised as a wire coil installed in the axial bore; and
    electrical connecting means connected to the heating element and connectable to an electric power source.

8. The heater device of claim 7 including:
    a stainless steel sheath surrounding said heating element.

9. The heater device of claim 7 wherein:
    said body is zinc plated and baked at 375 degrees F. for eight hours.

10. The heater device of claim 9 including:
    a stainless steel sheath surrounding said heating element.

11. The heater device of claim 10 wherein:
    said heating element is comprised as a coil of Nichrome wire.

* * * * *

UNITED STATES PATENT AND TRADEMARK OFFICE
CERTIFICATE OF CORRECTION

PATENT NO. : 5,196,673
DATED : March 23, 1993
INVENTOR(S) : Peter G. Tanis

It is certified that error appears in the above-indentified patent and that said Letters Patent is hereby corrected as shown below:

Abstract, line 7 "apprximately" should read --approximately--.

Column 4, line 22, "2" should read --1--.

Signed and Sealed this

Fifteenth Day of February, 1994

Attest:

BRUCE LEHMAN

*Attesting Officer*    *Commissioner of Patents and Trademarks*